United States Patent [19]

Muse et al.

[11] Patent Number: 5,328,963
[45] Date of Patent: Jul. 12, 1994

[54] SULFUR VULCANIZED RUBBER COMPOUNDS CONTAINING MALEAMIC ACID

[75] Inventors: Joel Muse, Hudson; Paul H. Sandstrom; Lawson G. Wideman, both of Tallmadge, all of Ohio

[73] Assignee: The Goodyear Tire & Rubber Company, Akron, Ohio

[21] Appl. No.: 63,816

[22] Filed: May 20, 1993

Related U.S. Application Data

[62] Division of Ser. No. 774,426, Oct. 10, 1991, Pat. No. 5,278,242.

[51] Int. Cl.$^5$ ............... C08F 265/10; C08G 73/10
[52] U.S. Cl. ................... 525/282; 525/331.8; 525/332.6; 525/354; 528/322
[58] Field of Search ............ 525/282, 331.8, 332.6, 525/354; 528/322

[56] References Cited

U.S. PATENT DOCUMENTS

| | | | |
|---|---|---|---|
| 3,200,152 | 8/1965 | Rupport et al. | 564/315 |
| 4,004,627 | 1/1977 | Sandstrom et al. | 152/355 |
| 4,020,039 | 4/1977 | Dunn et al. | 524/425 |
| 4,248,987 | 2/1981 | Maeda et al. | 525/366 |
| 4,560,729 | 12/1985 | Watanabe et al. | 525/233 |
| 4,654,407 | 3/1987 | Domeier | 526/262 |
| 4,681,928 | 7/1987 | Berger et al. | 528/353 |
| 4,743,647 | 5/1988 | Domeier | 524/516 |
| 4,803,250 | 2/1989 | Nagasaki et al. | 525/329.3 |
| 4,818,601 | 4/1989 | Itoh et al. | 428/297 |
| 4,933,385 | 6/1990 | Yamamoto et al. | 524/105 |

FOREIGN PATENT DOCUMENTS

| | | |
|---|---|---|
| 797912 | 10/1968 | Canada . |
| 0268080 | 5/1988 | European Pat. Off. . |
| 55-129254 | 10/1980 | Japan . |
| 58-154542 | 9/1983 | Japan . |
| 77391987 | 1/1987 | Japan . |
| 8700845 | 2/1987 | PCT Int'l Appl. . |
| 880596 | 3/1960 | United Kingdom . |
| 1346455 | 4/1971 | United Kingdom . |

*Primary Examiner*—John Kight, III
*Assistant Examiner*—Terressa Mosley
*Attorney, Agent, or Firm*—Bruce J. Hendricks

[57] ABSTRACT

The present invention relates to a sulfur vulcanized rubber composition containing 0.1 to 10.0 phr of an oligomeric maleimide of the formula:

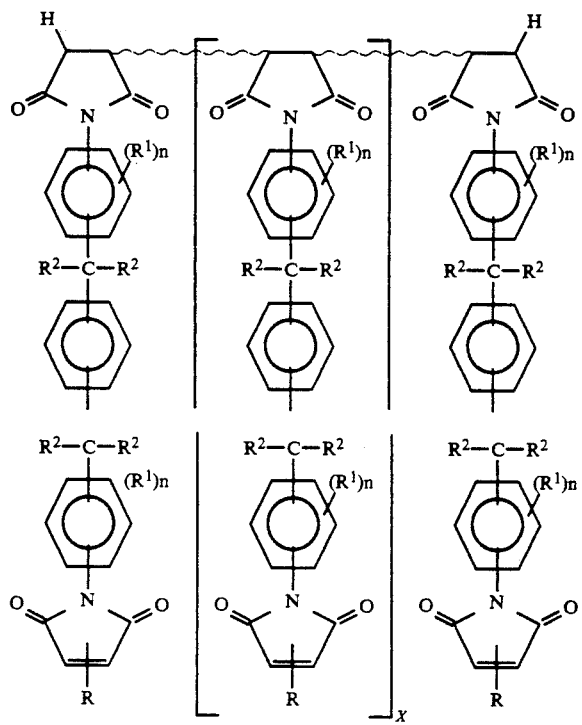

or a maleamic acid of the formula:

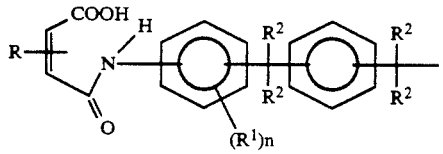

(Abstract continued on next page.)

-continued

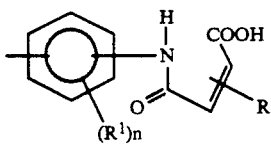

wherein R and $R^1$ are individually selected from the group of radicals consisting of hydrogen, an alkyl having 1 to 4 carbon atoms or a halogen; $R^2$ is selected from the group of radicals consisting of 1 to 12 carbon atoms; X has a value of from 1 to 146 and n has a value of from 0 to 4.

The presence of the maleimide oligomer or maleamic acid improve cord adhesion to the sulfur vulcanized rubber compound.

5 Claims, No Drawings

SULFUR VULCANIZED RUBBER COMPOUNDS CONTAINING MALEAMIC ACID

This is a divisional of application Ser. No. 07/774,426, filed on Oct. 10, 1991, U.S. Pat. No. 5,278,242.

BACKGROUND OF THE INVENTION

A pneumatic tire is a polymeric composite and is a complex system of interacting components, each with specific properties for maximum effectiveness. A frequent problem in making a rubber composite is maintaining good adhesion between the rubber and the reinforcement. A conventional method in promoting the adhesion between the rubber and the reinforcement is to pretreat the reinforcing fiber with a mixture of a rubber latex and a phenol-formaldehyde condensation product wherein the phenol is almost always resorcinol. This is the so called "RFL" (resorcinol-formaldehydelatex) method. An alternative method of promoting such adhesion is to generate the resin in-situ (in the vulcanized rubber/textile matrix) by compounding a vulcanizing rubber stock composition with the phenol/formaldehyde condensation product (hereinafter referred to as the "in-situ method"). The components of the condensation product consist of a methylene acceptor and a methylene donor. The most common methylene donors include N-(substituted oxymethyl) melamine, hexamethylenetetramine or hexamethoxymethylmelamine. A common methylene acceptor is a dihydroxybenzene compound such as resorcinol. The in-situ method has been found to be particularly effective where the reinforcing material is steel wire since pretreatment of the wire with the RFL system has been observed to be largely ineffective.

Resorcinol is known to form a resin network within a rubbery polymer by reacting with various methylene donors. Unfortunately, the use of resorcinol has some inherent disadvantages. Resorcinol is not readily dispersed in rubber and in fact neither the resin, nor the resorcinol become chemically bound to the rubber. Additionally, resorcinol in its raw form is excessively volatile and is potentially toxic, thus posing a health hazard. Another disadvantage in using resorcinol is periodic market shortages of supply.

There have been numerous attempts to replace resorcinol, however, few if any have had much success. For example, in U.S. Pat. No. 4,605,695 there is disclosed a method for enhancing adhesion of rubber to reinforcing materials through the use of phenolic esters as the methylene acceptor. These phenolic esters are less volatile than resorcinol, but still offer no readily reactive site for chemically attaching the resin to the rubber.

Therefore, there exists a need to find a suitable adhesion promoter.

SUMMARY OF THE INVENTION

The present invention relates to a sulfur vulcanized rubber compound comprising a sulfur vulcanized rubber, and 0.1 to 10.0 phr of an oligomeric maleimide of the formula:

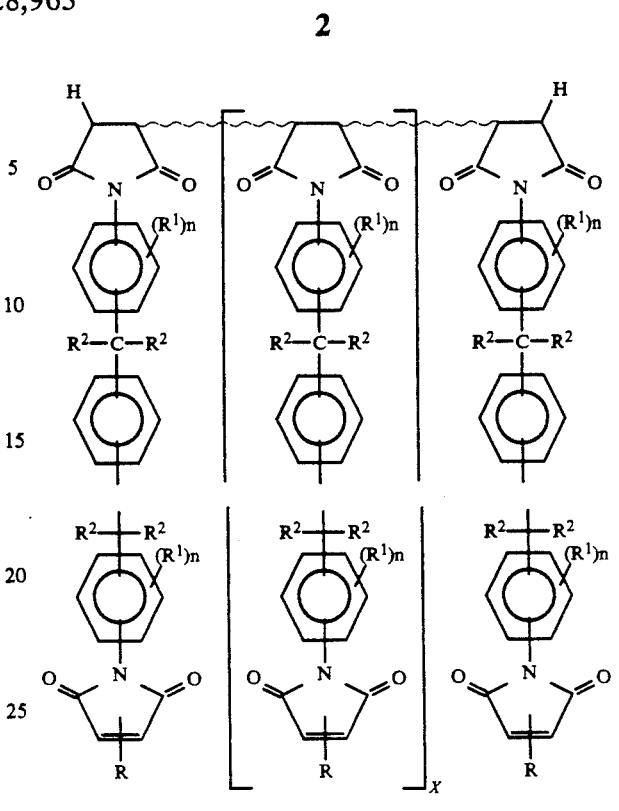

or a maleamic acid of the formula:

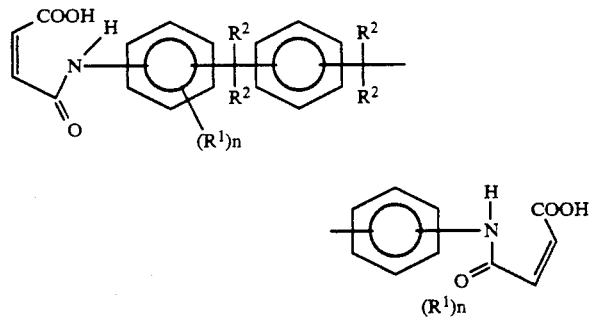

wherein R and $R^1$ are individually selected from the group of radicals consisting of hydrogen, an alkyl having 1 to 4 carbon atoms or a halogen; $R^2$ is selected from the group of radicals consisting of 1 to 12 carbon atoms; X has a value of from 1 to 146 and n has a value of from 0 to 4.

DETAILED DESCRIPTION OF THE PREFERRED EMBODIMENT

The maleimide oligomer or maleamic acid may be used at various levels in the rubber compounds of the present invention. For example, the level may range from about 0.1 to 10.0 by weight per 100 parts of rubber (also known as "phr"). Preferably, the level ranges from about 0.5 to about 5.0 phr.

In accordance with the preferred embodiment, R is hydrogen, $R^1$ is hydrogen, $R^2$ is an alkyl of 1 carbon atom and n has a value of 0.

The maleamic acids used in the present invention can be prepared by condensing certain diamines with maleic anhydride or substituted maleic anhydride. Representative diamines that may be used include α,α'-bis-(4-aminophenyl)-meta-diisopropylbenzene and α,α'-bis-(4-aminophenyl)-para-diisopropylbenzene.

Maleic anhydride or substituted maleic anhydride is reacted with the above diamine compound under suitable conditions to form the maleamic acid. The anhydride may be reacted with any of the above diamine compounds in a variety of mole ratios. Generally the mole ratio of the anhydride to the diamine compound ranges from about 2.5:1 to about 0.75:1 with a range of from about 2.1:1 to about 1.9:1 being preferred.

An organic solvent may be used to dissolve the anhydride or diamine compound. The solvent is preferably inert to the reaction between the anhydride and the diamine compound. Illustrative of solvents suitable for use in the practice of this invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, alkvl-naphthalene, and the like; acetone; ethers such as tetrahydrofuran, tetrahydropyran, diethylether, 1,2-dimethoxybenzene, 1,2-diethoxybenzene, the mono- and dialkylethers of, ethylene glycol, propylene glycol, butylene glycol, diethylene glycol, dipropylene glycol, oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and will adequately dissolve the diamine or anhydride compound and not interfere with the reaction.

The reaction between the anhydride and the diamine compound to form the maleamic acid may be conducted over a wide temperature range. The temperature may range from moderate to an elevated temperature. In general, the reaction may be conducted at a temperature of between about 20° C. to 100° C. The preferred temperature range is from about 30° C. to 80° C., while the most preferred temperature range is from about 55° to 65° C.

The reaction to form the maleamic acid may be conducted under a variety of pressures. Pressures ranging from about 0 psig to 100 psig may be used.

The oligomeric maleimide used in the present invention is also prepared by condensing the above diamines with maleic anhydride or substituted maleic anhydride.

As in the preparation of the maleamic acids, the mole ratio of the anhydride to diamine, organic solvents and reaction pressures may be the same as discussed above.

The reaction between the anhydride and the diamine compound to form the oligomeric maleimide is conducted in the presence of a catalyst. Examples of catalysts that may be used include acid catalysts such as sulfuric acid, hydrochloric acid and toluenesulfonic acid. The amount of catalyst that may be used will vary depending on the particular catalyst that is selected. For example, when an acid catalyst is used, from about 5% to about 10% by weight of the diamine is recommended.

The reaction to prepare the oligomeric maleimide is normally conducted at higher temperatures than used in preparing the maleamic acid. In general, the reaction may be conducted at a temperature of between about 100 to about 200° C. The preferred temperature range is from about 120° to 180° C., while the most preferred temperature range is from about 140° to about 160° C.

The reaction to form the oligomeric maleimide or maleamic acid is conducted for a period of time sufficient to produce the desired product. In general, the reaction time can vary from minutes to several hours. If the more sluggish reaction conditions are selected, then the reaction time will have to be extended until the desired product is produced. It is appreciated that the residence time of the reactants will be influenced by the reaction temperature, concentration and choice of catalyst, total gas pressure, partial pressure exerted by its components, concentration and choice of solvent, and other factors. When one is preparing the oligomeric maleimide, desirably, the reaction is conducted until a molar equivalent of water has been removed.

The process for the preparation of the oligomeric maleimide or maleamic acid may be carried out in a batch, semi-continuous or continuous manner. The reaction may be conducted in a single reaction zone or in a plurality of reaction zones, in series or in parallel. The reaction may be conducted intermittently or continuously in an elongated tubular zone or in a series of such zones. The material of construction of the equipment should be such as to be inert during the reaction. The equipment should also be able to withstand the reaction temperatures and pressures. The reaction zone can be fitted with internal and/or external heat exchangers to control temperature fluctuations. Preferably, an agitation means is available to ensure the uniform reaction. Mixing induced by vibration, shaker, stirrer, rotating, oscillation, etc. are all illustrative of the types of agitation means which are contemplated for use in preparing the composition of the present invention. Such agitation means are available and well known to those skilled in the art.

The use of the oligomeric maleimide or maleamic acid improves the properties of "sulfur vulcanized elastomers or rubbers" The term "sulfur vulcanized elastomer or rubber" as used herein embraces both vulcanized forms of natural and all its various raw and reclaim forms as well as various synthetic rubbers. Representative synthetic polymers include the homopolymerization products of butadiene and its homologues and derivatives, as for example, methylbutadiene, dimethylbutadiene and pentadiene as well as copolymers such as those formed from butadiene or its homologues or derivatives with other unsaturated organic compounds. Among the latter are acetylenes, for example, vinyl acetylene; olefins, for example, isobutylene, which copolymerizes with isoprene to form butyl rubber; vinyl compounds, for example, acrylic, acid, acrylonitrile (which polymerizes with butadiene to form NBR), methacrylic acid and styrene, the latter polymerizing with butadiene to form SBR, as well as vinyl esters and various unsaturated aldehydes, ketones and ethers, e.g. acrolein, methyl isopropenyl ketone and vinylethyl ether. Also included are the various synthetic rubbers prepared by the homopolymerization of isoprene and the copolymerization of isoprene and other diolefins in various unsaturated organic compounds. Also included are the synthetic rubbers such as 1,4-cis-polybutadiene and 1,4-cis-polyisoprene and similar synthetic rubbers.

Specific examples of synthetic rubbers include neoprene (polychloroprene), polybutadiene (including trans- and cis-1,4-polybutadiene), polyisoprene (including cis-1,4-polyisoprene), butyl rubber, copolymers of 1,3-butadiene or isoprene with monomers such as styrene, acrylonitrile and methyl methacrylate as well as ethylene/propylene terpolymers, also known as ethylene/propylene/diene monomer (EPDM), and in particular, ethylene/propylene/dicyclopentadiene terpolymers. The preferred synthetic rubbers for use in the present invention are polybutadiene, polyisobutylene, butadiene-styrene copolymers and cis,1,4-polyisoprene.

The vulcanizable rubber compositions of the present invention may contain a methylene donor. The term "methylene donor" is intended to mean a compound capable of reacting with the oligomeric maleimide or maleamic acid and generate the resin in-situ. Examples of methylene donors which are suitable for use in the present invention include hexamethylene tetramine, hexaethoxymethylmelamine, hexamethoxymethylmelamine, lauryloxymethylpyridinium chloride, ethoxymethylpyridinium chloride, trioxan hexamethoxymethylmelamine, the hydroxyl groups of which may be esterified or partly esterified, and polymers of formaldehyde such as paraformaldehyde. In addition, the methylene donors may be N-substituted oxymethylmelamines, of the general formula:

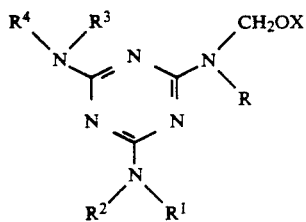

wherein X is an alkyl having 1 to 8 carbon atoms; R, $R^1$, $R^2$, $R^3$ an $R^4$ are individually selected from hydrogen, alkyl having from 1 to 8 carbon atoms, the group $-CH_2OX$ or their condensation products. Specific methylene donors include hexakis(methoxymethyl) melamine, N,N',N''-trimethyl N,N',N''-trimethylolmelamine, hexamethylolmelamine, N-methylolmelamine, N,N'-dimethylolmelamine, N,N',N''-tris (methoxymethyl) melamine and N,N',N''-tributyl-N,N',N''- trimethylolmelamine. The N-methylol derivatives of melamine are prepared by known methods.

The weight ratio of methylene donor to the oligomeric maleimide or maleamic acid may vary. Generally speaking, the weight ratio will range from about 1:10 to about 10:1. Preferably, the weight ratio ranges from about 1:3 to 3:1.

Vulcanization of the rubber compound of the present invention is generally carried out at conventional temperatures ranging from about 100° C. and 200° C. Preferably, the vulcanization is conducted at temperatures ranging from about 110° C. to 180° C. Any of the usual vulcanization processes may be used such as heating in a press or mold, heating with superheated steam or hot air or in a salt bath.

In addition to the oligomeric maleimide or maleamic acid, other rubber additives may also be incorporated in the rubber compound. The additives commonly used in rubber vulcanizates are, for example, carbon black, tackifier resins, processing aids, antioxidants, antiozonants, stearic acid, activators, waxes, oils and peptizing agents. As known to those skilled in the art, depending on the intended use of the rubber compound, certain additives mentioned above are commonly used in conventional amounts. Typical additions of carbon black comprise about 20 to 100 parts by weight of diene rubber (phr), preferably 30 to 80 phr. Typical amounts of tackifier resins comprise about 1 to 5 phr. Typical amounts of antioxidants comprise 1 to about 10 phr.

Typical amounts of antiozonants comprise 1 to about 10 phr. Typical amounts of stearic acid comprise 1 to about 2 phr. Typical amounts of zinc oxide comprise 2 to 5 phr. Typical amounts of waxes comprise 1 to 5 phr. Typical amounts of oils comprise 5 to 40 phr. Typical amounts of peptizers comprise 0.1 to 1 phr. The presence and relative amounts of the above additives are not an aspect of the present invention.

The vulcanization of the rubber compound is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 8 phr with a range of from 1.0 to 2.25 being preferred.

Accelerators are conventionally used to control the time and/or temperature required for vulcanization and to improve the properties of the vulcanizate. In some instances, a single accelerator system may be used, i.e., primary accelerator. Conventionally, a primary accelerator is used in amounts ranging from about 0.5 to 2.0 phr. In another instance, combinations of two or more accelerators may be used which may consist of a primary accelerator which is generally used in the large amount (0.5 to 2.0 phr), and a secondary accelerator which is generally used in smaller amounts (0.01–0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used include amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

The rubber compounds containing the oligomeric maleimide or maleamic acid may be used in the preparation of composite products including tires, power belts, conveyor belts, printing rolls, rubber shoe heels and soles, rubber wringers, automobile floor mats, mud flaps for trucks, ball mill liners, and the like. Preferably, the rubber vulcanizates are used in carcass ply or overlay compounds for tires.

The following examples are presented in order to illustrate but not limit the present invention.

Example 1

Preparation of Oligomeric Bis Maleimide

A dry one-liter 3-neck round bottom flask was fitted with a modified Dean-Stark trap, a cold water condenser and a thermometer. The flask was charged with 98 gm (1.0 mole) maleic anhydride dissolved in 400 ml m-xylene; 10 gm of toluene sulfonic acid; and 172 gm (0.5 mole) of EPON HPT Curing Agent 1061-M from Shell Oil Company. EPON HPT is a mixture of the para, para-; the ortho, para-, and ortho, ortho-isomers of $\alpha,\alpha'$-bis-(4-aminophenyl)diisopropylbenzene. The flask was flushed with nitrogen and sealed under a nitrogen balloon. The flask was then heated to reflux, approximately 145° C., and maintained until a stoichiometric amount of water (18 mls, 1 mole) was removed via the Dean-Stark trap. The flask was allowed to cool to room temperature and the resulting product, oligomeric maleimide was poured into a container and vacuum-oven dried at 80° C. for several hours to remove the excess m-xylene solvent. The reaction yielded 302 gm of light gray brown colored solid having a melt point of from 151°-178° C. GPC analysis shows high molecular weight oligomers ranging from 1500 to 74000 MW.

EXAMPLE 2

Preparation of Maleamic Acid

A 3-liter 3-neck round bottom flask was fitted with a thermocouple, an electric stirrer and a nitrogen balloon. The flask was charged with 98 gms (1.0 mole) maleic anhydride dissolved in 400 ml m-xylene. EPON HPT (172 gm, 0.5 mole) was slowly added with a funnel as the mixture in the flask was stirred vigorously at 42° C. An additional 400 mls of m-xylene was used to rinse the amine into the flask. The reaction exothermed from 42° C. to 55° C. The reaction was stirred and maintained at a temperature of 50°-55° C. for 4 hours, then cooled to a temperature of 10° C., with stirring, by immersing the flask in ice water. The resulting product was suction filtered and air dried, producing 272 gm of tan colored product having a melt point of from 191° to 198° C.

EXAMPLE 3

Physical Testing

Table I below shows the basic rubber compound that was used in this example. The rubber compound was prepared in a 3-stage Banbury mix. All parts and percentages are by weight unless otherwise noted. The cure data as well as other physical data for each sample are listed in Table II.

TABLE I

|  | Control Sample 1 | Sample 2 | Sample 3 |
|---|---|---|---|
| 1st Non-Productive |  |  |  |
| Natural Rubber | 100.0 | 100.0 | 100.0 |
| Carbon Black | 20.0 | 20.0 | 20.0 |
| 2nd Non-Productive |  |  |  |
| Carbon Black | 30.0 | 30.0 | 30.0 |
| Oligomeric Maleimide of Ex 1 | 0 | 2.0 | 0 |
| Maleamic Acid of Ex 2 | 0 | 0 | 2.0 |
| Fatty Acid | 1.0 | 1.0 | 1.0 |
| Processing Oil | 5.0 | 5.0 | 5.0 |
| Zinc Oxide | 5.0 | 5.0 | 5.0 |
| Antioxidant | 2.0 | 2.0 | 2.0 |
| Productive |  |  |  |
| Sulfur, Sulfenamide, Accelerator, Retarder | 1.0/1.5/0.2 | 1.0/1.5/0.2 | 1.0/1.5/0.2 |

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following Table II reports cure properties that were determined from cure curves that were obtained for the two rubber formulations that were prepared. These properties include a torque minimum (Min Torque), a torque maximum (Max Torque), minutes to 25% of the torque increase (t25 min.), and minutes to 90% of the torque increase (t90 min.).

Peel adhesion testing was done to determine the interfacial adhesion between various rubber formulations that were prepared. The interfacial adhesion was determined by pulling one compound away from another at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during testing.

Adhesion to nylon and Flexten was evaluated using the Tire Cord Adhesion Test (TCAT). Compound adhesion to tire wire was also evaluated using the TCAT test. Samples were prepared and tested according to the procedures described by D.W. Nicholson, D. I. Livingston, and G. S. Fielding-Russell, *Tire Science and Technology* (1978) 6,114; G. S. Fielding-Russell and D. I. Livingston, *Rubber Chemistry and Technology* (1980) 53,950; and R. L. Rongone, D. W. Nicholson and R. E. Payne, U.S. Patent No. 4,095,465 (June 20, 1978).

Shore Hardness was determined in accordance with ASTM-1415.

TABLE II

|  | Control Sample 1 | Sample 2 | Sample 3 |
|---|---|---|---|
| Oligomeric Maleimide | 0 | 2.0 | 0 |
| Maleamic Acid | 0 | 0 | 2.0 |
| Rheometer (150° C.) |  |  |  |
| Max. Torque | 39.1 | 41.4 | 37.1 |
| Min. Torque | 9.1 | 9.3 | 9.2 |
| t90, minutes | 14.7 | 16.4 | 16.4 |
| t25, minutes | 10.6 | 11.7 | 11.0 |
| Stress-Strain |  |  |  |
| Tensile Strength, MPa | 19.8 | 20.8 | 16.3 |
| Elongation at Break % | 492 | 472 | 438 |
| 100% Modulus, MPa | 1.86 | 2.19 | 1.89 |
| 300% Modulus, MPa | 10.8 | 12.5 | 10.4 |
| Rebound (ASTM D1054) |  |  |  |
| 100° C., % | 60.1 | 60.4 | 58.2 |
| Room Temperature, % | 48.4 | 48.6 | 47.5 |
| Adhesion (Newtons) |  |  |  |
| Nylon Cord | 28.8 | 36.0 | 34.4 |
| Flexten Cord | 18.9 | 25.5 | 25.5 |
| Tire Wire | 307 | 380 | 380 |
| Rheovibron |  |  |  |
| E' at 60° C., MPa | 12.5 | 15.2 | 13.0 |
| Tan Delta at 60° C. | .102 | .083 | .100 |
| Hardness, Shore A |  |  |  |
| Room Temperature | 58.6 | 61.7 | 58.9 |
| 100° C. | 53.5 | 57.2 | 53.7 |

As can be seen in Table II, Samples 2 and 3 had improved adhesion values over the control. With respect to Sample 2, the values for stress-strain, Rheovibron and Shore A hardness were improved over the control.

EXAMPLE 4

Physical Testing

Table III below shows the basic rubber compound that was used in this example. The rubber compound was prepared in a 2-stage Banbury mix. All parts and percentages are by weight unless otherwise noted. The cure data as well as other physical data for each sample are listed in Table IV.

TABLE III

|  | Control Sample 1 | Sample 2 |
|---|---|---|
| 1st Non-Productive |  |  |
| Natsyn ® 2200 | 100.0 | 100.0 |
| Carbon Black | 50.0 | 50.0 |
| Processing Oil | 5.0 | 5.0 |
| Zinc Oxide | 5.0 | 5.0 |
| Fatty Acid | 1.0 | 1.0 |
| Antioxidant | 2.0 | 2.0 |
| Maleamic Acid of Ex. 2 | 0 | 2.0 |
| Productive |  |  |
| Sulfur | 1.0 | 1.0 |
| Sulfenamide Accelerator | 1.5 | 1.5 |
| Retarder | 0.2 | 0.2 |

TABLE IV

|  | Control Sample 1 | Sample 2 |
|---|---|---|
| Maleamic Acid | 0 | 2.0 |
| Rheometer (150° C.) |  |  |
| Max. Torque | 40.5 | 39.3 |
| Min. Torque | 10.4 | 10.8 |
| t90, minutes | 17.6 | 21.0 |
| t25, minutes | 14.1 | 16.4 |
| Stress-Strain |  |  |
| Tensile Strength, MPa | 21.3 | 18.7 |
| Elongation at Break % | 563 | 546 |
| 100% Modulus, MPa | 1.86 | 1.79 |
| 300% Modulus, MPa | 9.71 | 8.76 |
| Rebound (ASTM D1054) |  |  |
| 100° C., % | 60.5 | 55.2 |
| Room Temperature, % | 45.4 | 44.7 |
| Adhesion (Newtons) |  |  |
| Nylon Cord | 115 | 123 |
| Flexten Cord | 101 | 145 |
| Polyester Cord | 98 | 110 |
| Rheovibron |  |  |
| E' at 60° C., MPa | 15.2 | 18.0 |
| Tan Delta at 60° C. | .100 | .108 |
| Hardness, Shore A |  |  |
| Room Temperature | 60.1 | 62.1 |
| 100° C. | 55.6 | 57.0 |

Use of the maleamic acid in Sample 2 improved the values for adhesion, rheovibron and Shore A hardness.

What is claimed is:

1. A sulfur vulcanized rubber compound comprising a sulfur vulcanized rubber, from about 0.1 to about 10.0 phr of a maleamic acid of the formula:

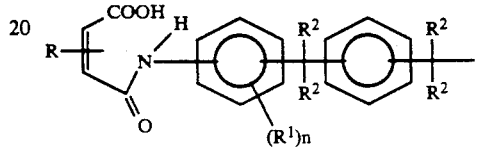

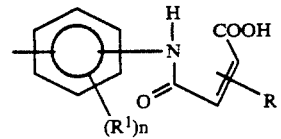

wherein R and $R^1$ are individually selected from the group of radicals consisting of hydrogen, an alkyl having 1 to 4 carbon atoms or a halogen; $R^2$ is selected from the group of radicals consisting of 1 to 12 carbon atoms and n has a value of from zero to 4.

2. The compound of claim 1 wherein R each is hydrogen, n is zero and that $R^2$ is an alkyl having 1 carbon atom.

3. The compound of claim 1 wherein the oligomeric maleimide or maleamic acid ranges from about 0.5 to about 5.0 phr.

4. The compound of claim 1 wherein R are each hydrogen, n is zero and $R^2$ are each an alkyl having 1 carbon atom.

5. The compound of claim 1 wherein the amount of oligomeric maleimide or maleamic acid ranges from about 0.5 to about 5.0 phr.

* * * * *